United States Patent [19]

Mocas

[11] 4,299,891
[45] * Nov. 10, 1981

[54] METHOD FOR FORMING BATTERY TERMINALS AND TERMINALS PRODUCED THEREBY

[75] Inventor: Verlin A. Mocas, Indianapolis, Ind.

[73] Assignee: The Richardson Company, Des Plaines, Ill.

[*] Notice: The portion of the term of this patent subsequent to Apr. 1, 1992, has been disclaimed.

[21] Appl. No.: 14,829

[22] Filed: Feb. 26, 1979

Related U.S. Application Data

[63] Continuation of Ser. No. 527,726, Nov. 27, 1974, Pat. No. 4,143,215.

[51] Int. Cl.³ .............................................. H01M 2/32
[52] U.S. Cl. .................................. 429/179; 429/181; 29/623.2
[58] Field of Search ............... 429/160, 178, 181, 179; 29/623.2

[56] References Cited

U.S. PATENT DOCUMENTS

| 3,674,085 | 7/1972 | Clingenpeel et al. | 429/160 |
| 3,703,589 | 11/1972 | Rigsby | 429/160 |
| 3,874,933 | 4/1975 | Mocas | 164/333 |
| 4,143,215 | 3/1979 | Mocas | 429/179 |

Primary Examiner—Donald L. Walton
Attorney, Agent, or Firm—Lockwood, Dewey, Alex & Cummings

[57] ABSTRACT

This invention relates to a method for forming metal battery terminals and to the terminals produced thereby for use with battery containers fabricated from thermally deformable materials such as polypropylene which involves casting the metal directly into place within and through the wall of such container.

10 Claims, 7 Drawing Figures

METHOD FOR FORMING BATTERY TERMINALS AND TERMINALS PRODUCED THEREBY

This is a continuation of application Ser. No. 527,726, filed Nov. 27, 1974 now U.S. Pat. 4,143,215.

Batteries, such as the conventional lead-acid automotive storage batteries, are provided with metal terminals for conducting electricity from the internal cell plates to the exterior of the battery container and are typically adapted for ready external mechanical connection to conductors for completion of a circuit to distribute the electrical power from the battery. Such terminals normally extend through the top wall or cover of the battery container. Recently, however, certain advantages have been achieved by extending such terminals through the side wall of the container. While such construction has proved desirable for battery operation, it has also presented certain problems in manufacturing the battery containers having such side wall terminals particularly with the newer thin walled containers fabricated from plastics such as polypropylene having wall thickness generally less than about 0.2 inches.

In the manufacture of plastic or polypropylene type battery containers one of two basic procedures is presently employed to install the metal terminals through the side wall of the container. In the first method because the plastic containers are most economically and advantageously formed through utilization of high speed injection molding techniques, the terminals are first independently formed and then placed within the wall during the latter phases of the injection molding cycle. This procedure is not widely utilized however, because the complexity of the molding apparatus and the substantial time delay resulting from installation of the terminals during molding tend to raise the cost of the manufacture to levels where the economies of high speed injection molding are negated. Moreover, installation of the preformed terminals in this fashion quite often provides serious problems in achieving a liquid tight seal about the terminal between the interior and exterior of the container so as to avoid loss of the highly corrosive acid electrolyte.

In the other conventional manufacturing proccedure the terminal is positioned through the wall of the container after the injection molding cycle is completed. This is typically achieved by first forming the container with an aperture opening adapted for receiving the terminal and then inserting a plurality of separate, preformed portions of the terminal into the aperture opening followed by welding such portions together to form a unitary terminal member and to lock the terminal into place through the wall. In thus securing the terminal, however, it is often necessary to supplement the welding with adhesives to insure a fluid tight seal about the terminal. The welding of the terminal, moreover, often results in a change in the physical structure or porosity of the terminal surface with formation of metal oxides and a high internal electrical resistance which adversely affect the current carrying capacity of the terminal and additionally often ultimately creates a poor bond between the cell plate strap and interior surface of the terminal when they are subsequently joined by welding in the final manufacture of the battery. In addition to causing an inferior electrical connection, this poor weld bond often fails during battery operation destroying the battery. Also, as in the first method of manufacture, forming a liquid tight seal about the terminal necessary to prevent loss of the liquid electrolyte is typically difficult to achieve even when employing expensive adhesives.

Accordingly an object of this invention is to provide a method for forming a metal terminal through the wall of a battery container which avoids the problems previously encountered in manufacturing such containers and simultaneously provides a highly efficient and economical procedure for manufacturing such terminals. Another object is to provide a method for forming such terminal by casting the terminal as a unitary, one piece member directly within and through the container side wall. A further object is to provide a metal terminal of a unitary member cast directly in place through the wall of a battery container with the terminal so produced having desirable electrical properties. A still further object is to provide a battery container fabricated from a thermally deformable material having a metal terminal cast directly within and extending through a wall of such container to provide excellent electrical conduction and a fluid tight seal about the terminal between the interior and exterior of such container. These and other objects of this invention will be apparent from the following further detailed description thereof as well as from the attached drawings.

IN THE DRAWINGS

Figure 1:
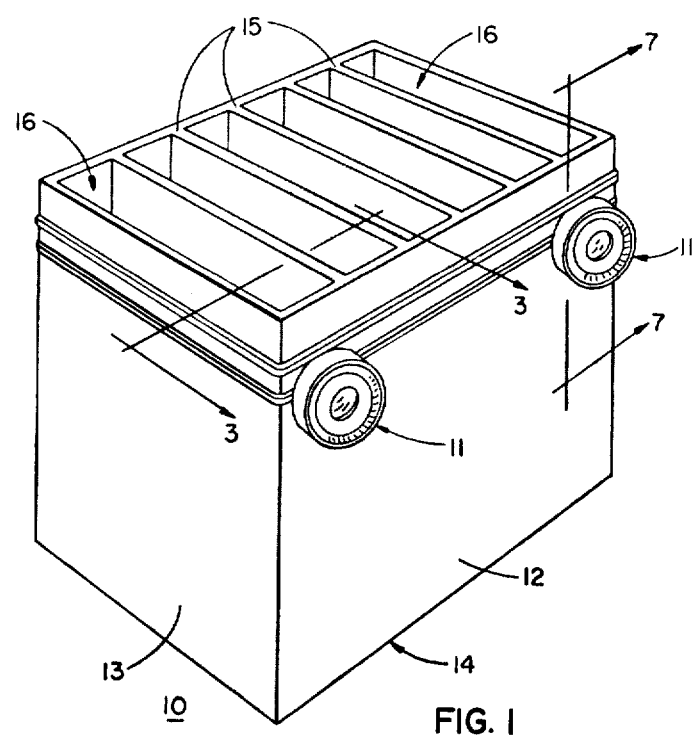
FIG. 1 is a perspective view of a battery container having terminals extending through the side wall in accordance with the present invention.

In general references to FIGS. 1 to 4 the battery container and metal terminals of this invention are illustrated by container 10 having terminals 11 extending through a side wall 12. Container 10 of box-like construction is defined by the vertical side walls 12 and end walls 13 respectively and horizontal bottom wall 14. Interior the container 10 are typically provided partitions 15 extending transversely between parallel side walls 12 and upwardly from bottom wall 14 thereby forming individual compartments 16 which serve as cell compartments for the lead plates and electrolyte (not shown) when container 10 is employed as a battery box. When so utilized container 10 is typically sealed by a top wall or cover (not shown) to fully enclose the cell compartments 16. Two terminals 11 are shown of identical structure and they represent typical container construction for batteries having a single positive and a single negative terminal. While container 10 can be fabricated from a diversity of materials including hard rubber, the benefits of the present invention are primarily achieved when container 10 is made from thermally deformable plastic materials such as polypropylene and especially when container 10 formed from such materials has relatively thin side walls 12 having a thickness within the range of below about 0.1 to about 0.2 inches.

As more fully explained hereinafter, the terminal 11, in accordance with the method of this invention is cast directly into place within and through the side wall 12 to achieve a unitary or one piece construction with particularly desirable electrical properties and additionally to provide a fluid tight seal about the terminal 11 between the interior and exterior of the container 10 without the conventional use of expensive adhesives. As shown best in FIGS. 3 and 4, this cast, unitary, one piece metal terminal 11 preferably has a main body portion 17 extending within and through the wall 12 and flared end portions 18 and 19 extending laterally over and flush with the adjacent portions of the interior and exterior surfaces 20 and 21, respectively, of the side wall 12, so as to anchor the terminal 11 in place within and through the wall 12. Cast internal and centrally located within the terminal 11 advantageously is a metal insert, shown simply as nut 22, having an internal threaded portion 24 to provide ready mechanical connection such as by a machine screw (not shown) to an external conductor (not shown) allowing completion of the battery circuit for distribution of electrical power from the battery. This insert or nut 22 is advantageously composed of a metal having a greater wear resistance then the metal of terminal 11 so as to allow repeated use of the threaded portion 24 for mechanical connection. For example, while the metal of the terminal 11 is preferably lead or a lead alloy containing, for example antimony, for easing of casting according to this invention, the nut 22 is suitably composed of a metal such as steel having a greater wear resistance than lead.

Figure 2:
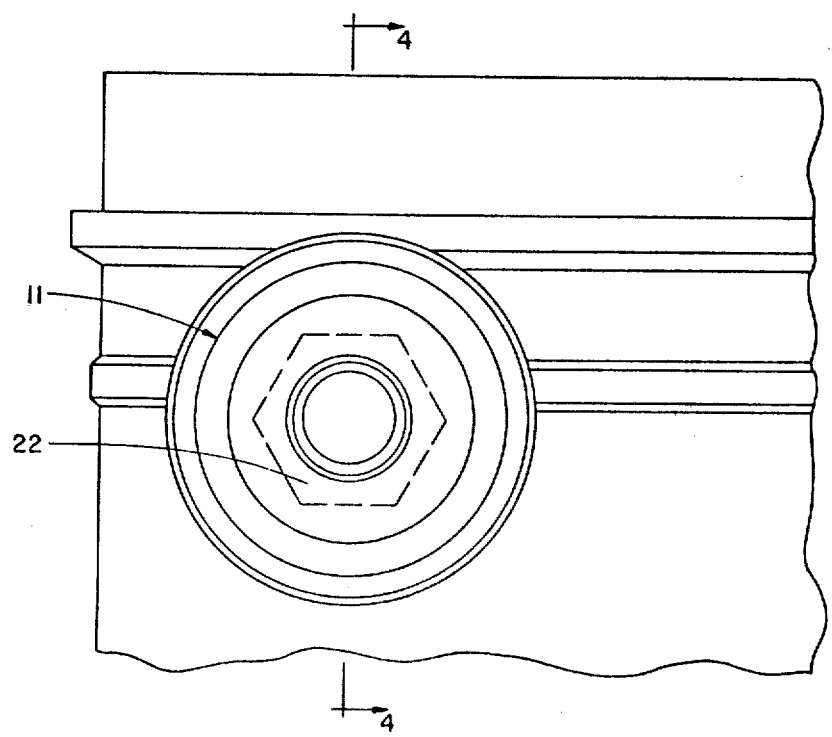
FIG. 2 is a partial elevation showing one terminal from the exterior of the container of FIG. 1.
Figure 3:
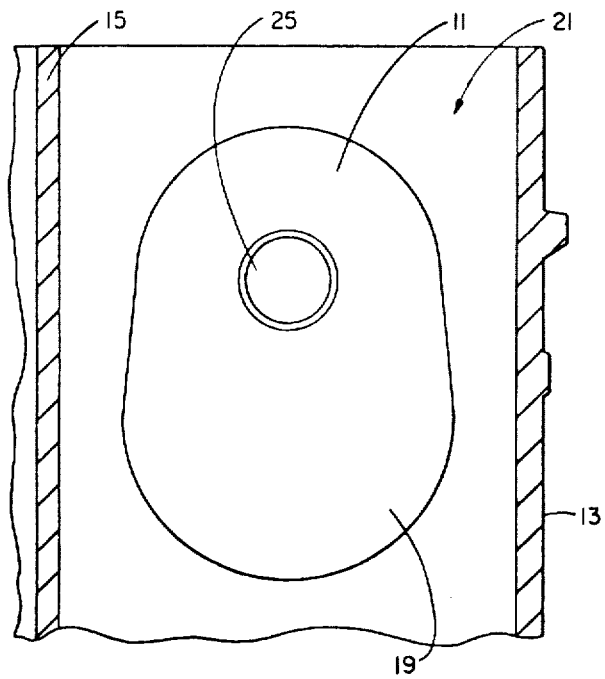
FIG. 3 is an enlarged section along line 3—3 of FIG. 1 showing the terminal from the interior of the container.
Figure 4:
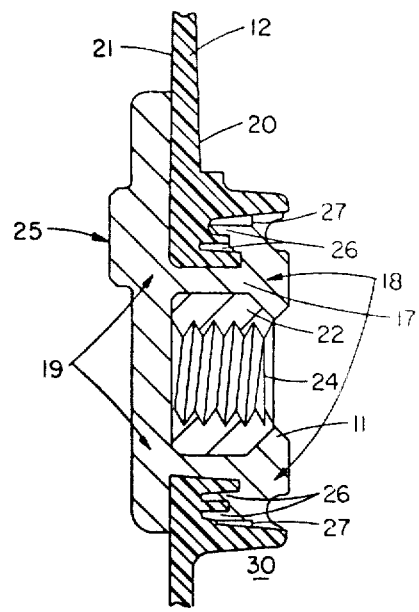
FIG. 4 is an enlarged cross section view taken along line 4—4 of FIG. 2 showing the terminal extending through the wall of the container.

While the terminal 11 according to the method of the invention advantageously and readily may be cast in any desired shape or configuration, as more fully explained hereinafter, a particularly suitable configuration is represented in FIGS. 2 and 4 where terminal 11 has a general L-shape with the main body portion 17 forming a leg extending horizontally through the side wall 12 and the internal flared end portion 19 generally forming the other leg extending vertically upward along the internal wall surface 21. On the internal surface of the terminal 11 a boss projection 25 of generally circular configuration is provided which serves as a contact point in typical battery construction for connecting the terminal 11, usually by welding, to a cell plate strap (not shown). Other desirable configurations for the terminal 11 may be used and a particularly suitable arrangement, for example, while not shown, is to cast terminal 11 so that the boss projection 25 is in the general shape of a elongated, bar having a general V-cross section and extending vertically upward substantially the full height of the terminal 11 to serve as a means for readily connecting a cell plate strap at any point along its vertical height to compensate for cell plates of different heights.

As best illustrated by reference to FIG. 4 and in a preferred embodiment the flared end portion 18 of the terminal 11 adjacent to the external wall surface 20, advantageously has a plurality of inwardly projecting portions 26 which mate and conform with a corresponding irregular contour of the exterior wall surface 20 so as to provide both a fluid tight seal between the exterior and interior of the container 10 as well as to lock the cast terminal securely into place through the wall 12. As a further preferred embodiment for locking the terminal 11 securely in place within the wall 12, the terminal 11 also conforms in locking relationship with lug projections 27 which are more fully described hereinafter particularly with respect to the method of preparing such cast terminal 11 according to the method of this invention.

In preparing the terminal 11 of container 10 according to the method of this invention the terminal 11, as indicated, is cast directly from molten metal into and through the side wall 12. This casting method achieves, in a highly economical manufacturing procedure, the particularly desirable results of producing a unitary, one piece terminal with excellent electrical properties and the ability to provide a fluid tight seal about the terminal 11 through the wall 12. It is somewhat surprising however, that such casting method may be so effectively and efficiently utilized particularly when the container 10 is fabricated from a thermally deformable, plastic material, such as polypropylene. Normally such casting operation would result in destruction of the composition or at least the structure of the side wall 12 particularly when such side wall 12 is relatively thin as occurs in most modern, so called "thin walled" battery cases. Typically, this would be expected because the metal, in the molten of fluid state necessary for casting must have a temperature substantially in excuss of the temperature where the deformable plastic materials is fluidized or destroyed. For example, metals such as lead or a lead-antimony alloy, which are conventionally employed for battery terminals, have melting points generally above about 600° to 620° F. whereas the melting or softening point of the thermally deformable plastics, such as polypropylene, is much lower and within the range of below about 300° F. Accordingly, contact of the hot, molten terminal metal with the thermally deformable relatively thin plastic side wall would normally be expected to result in destruction of such wall 12 or at least deterioration of its structure to the extent that a fluid tight seal about the terminal 11 would be precluded. Such destruction of the side wall 12 or deterioration of its structure is avoided, however, and simultaneously with the obtainment of a terminal 11 having good electrical properties and a fluid tight seal between the interior and exterior of the container 10 in the method of this invention as more fully explained hereinafter.

Figure 5:
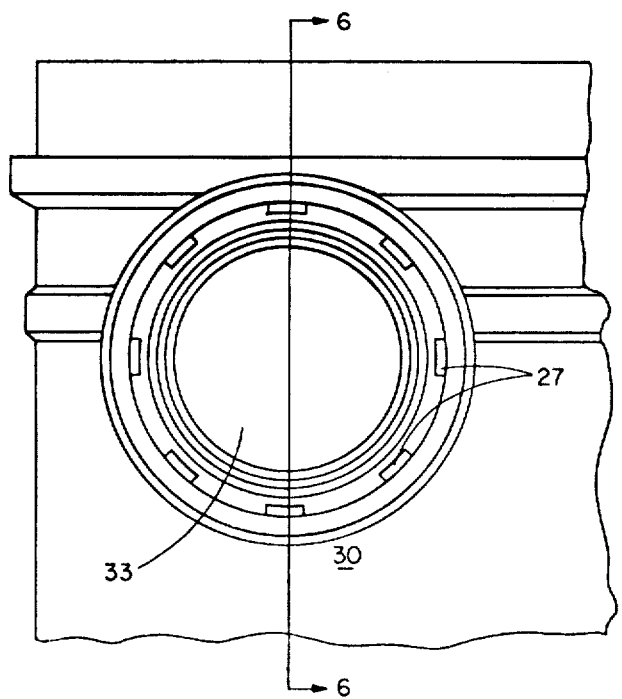
FIG. 5 is an enlarged, partial elevation view from the exterior of the container of FIG. 1 showing a wall port in the wall of such container prior to casting the terminal in place therein according to the method of this invention.
Figure 6:
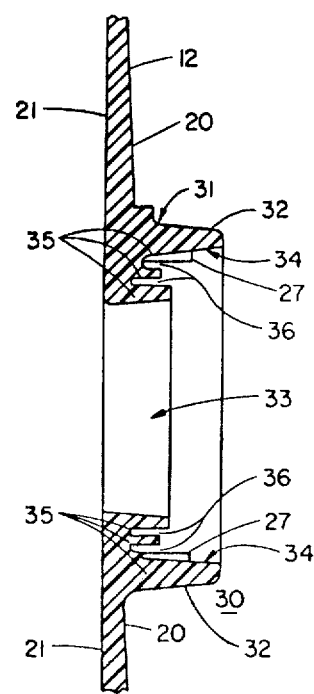
FIG. 6 is an enlarged cross section taken along line 6—6 of FIG. 5 showing details of the wall port.

This method of the present invention is generally effected, as best illustrated in FIGS. 5 and 6, by first providing a container 10, preferably with an opening or wall port 30 integral with the wall 12 and adapted for receiving the cast terminal 11. This is conveniently accomplished by injection molding techniques and typically a thermally deformable, plastic material such as polypropylene is first injection molded to form the container 10 having a wall port 30 or plurality of such ports 30 depending upon the number of terminals 11 to be cast into and through the side wall 12. The wall port 30 in a preferred embodiment is, advantageously, in the form of a boss structure 31, unitary with the side wall 12. This boss structure 31 has a circular ring portion 32 extending outwardly from the side wall 12 and defining an aperture opening 33 throught the wall 12 within and through which the terminal 11 is cast. Advantageously and for reasons more fully explained hereinafter, the boss 31 has an irregular, contoured surface 34 which serves during the casting to lock the terminal 11 into place within the wall 12 and further to provide a fluid tight seal around the terminal 11 between the interior and exterior of the container 10. Preferably and as shown best in FIG. 6, this irregular contoured surface 34 is achieved by shaping the boss 31 into a plurality of circular ring projections 35 which form or define therebetween hollow concentric spaces 36. During the casting, as more fully detailed hereinafter, the terminal metal flows into these spaces 36 and upon solidifying, the projecting portions 26 of the terminal 11 (FIG. 4) held within the spaces 36 serve to lock the terminal 11 in place and additionally provide a fluid tight seal about the terminal 11 through the wall 12.

As a further means of locking the terminal 11 into place within and through the wall 12 of the container 10, the port 30 is provided, during injection molding of the container 10, with a plurality of, and more specifically at least one lug projection 27 on the interior periphery of the circular ring 32 which extends radially inwardly. These lug projections 27 become embedded in the terminal 11 during casting and serve to hold the solidified terminal 11 locked in place within the side wall 12 and to resist any rotational movement exerted upon the terminal 11 for example, when a machine screw (not shown) is threaded into the nut 22.

Figure 7:
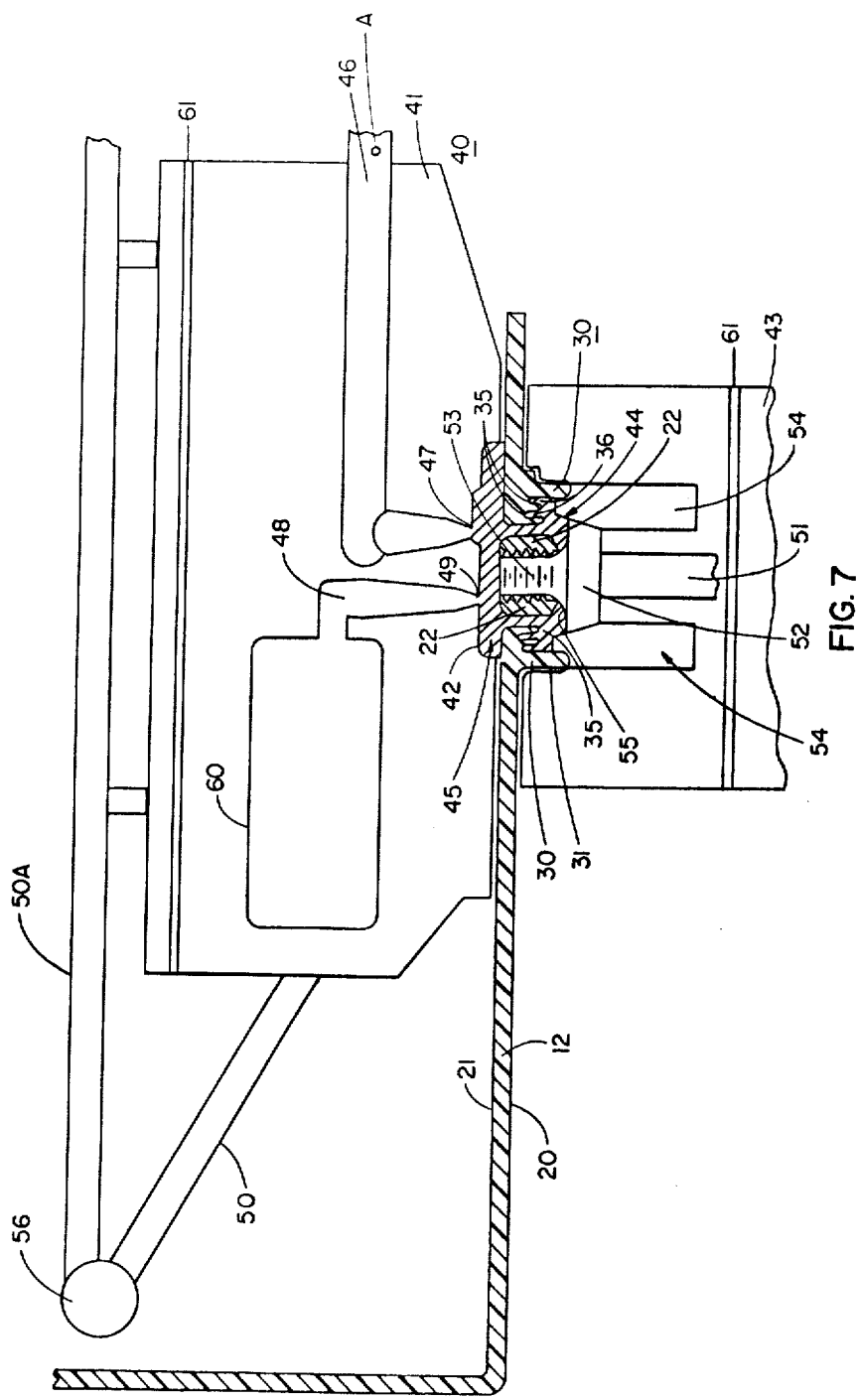
FIG. 7 is an enlarged cross section taken along line 7—7 of FIG. 1 and illustrates the container of FIG. 1 during the mold casting of the terminal in a die mold apparatus according to this invention.

In casting the terminal 11 within and through the wall 12 according to the method of this invention and when utilizing the container 10, prepared for example by injection molding, with the wall port 30, various metal casting techniques may be employed with differed die mold apparatus. One preferred method, however, may be illustrated best by reference to FIG. 7 showing die mold apparatus 40. Mold assembly 40, shown in simple and uncomplicated fashion for ease of understanding, is basically composed of a top die block 41 having a concave section 42 and a bottom die block 43 having a corresponding concave section 44 which co-operate in operation together with the side wall 12 of container 10 to form a die cavity 45 therebetween and about the port 30. Located in top die block 41 is metal delivery sprue 46 terminating in fluid communication with the die cavity 45 through gate 47. Also within the upper die block 41 is exit sprue 48 communicating with the die cavity 45 via gate 49. As shown in FIG. 7, mold assembly 40 is in a closed position, representing the metal casting cycle of the mold casting operation with top die block 41 resting against the interior surface 21 of the wall 12 and supported by rod 50. Die block 41 is securely forced against the interior wall surface 21, by action of suitable means for example, push bar 50a to make a fluid tight seal and, to form generally, by means of the concave section 42, the upper half of the die cavity 45. Bottom die block 43 similarly rests securely against the exterior wall surface 20 of the side wall 12 and forms with such wall surface 20 a fluid tight seal and generally, by means of the concave section 44, the lower half of the die cavity 45. Shown, in a preferred embodiment, die block 43 includes a rotatable shaft 51 supporting insert holder 52 having an upper threaded section 53 upon which the insert or nut 22 is threadably mounted. Rotatable shaft 51 mates with an internal bearing 54 of the die block 43 and forms with concave section 44 a fluid tight seal therebetween for the die cavity 45.

In operation of the mold apparatus 40, according to the method of this invention, the container 10 having the wall port 30 is positioned in the mold apparatus 40 and brought into registry with the die blocks 41 and 43 so that upon closure of the assembly 40 in clam-like movement as represented in FIG. 7, the wall port 30 will be properly spaced within the die cavity 45 and additionally so that the insert holder 52 with the nut 22 threadably mounted thereon is centrally positioned within the wall port 30. Molten metal (not shown) preferably containing a preponderance of lead is then delivered under pressure into sprue 46 through gate 47 and into die cavity 45 defined generally by the wall 12 and concave sections 42 and 44. As the molten metal flows into the die cavity 45 it flows around and about the nut 22 and generally takes a conforming shape to that of the die cavity 45. A shoulder portion 55 of the insert holder 52 seats against the nut 22 and accordingly prevents any molten metal from flowing into the internal threaded section 53. Also as the molten metal flows into the die cavity 45 it fills the concentric hollow spaces 36 of the wall port 30 (FIG. 6). Because of the high temperature of the molten metal, it melts portions of the wall surfaces 20 and 21 of the side wall 12 and the surfaces of the projections 35 of the port 30 (FIG. 6) thus actually fusing the molten metal with such portions of the wall 12 and thereby forming a fluid tight seal about the terminal 11 which avoids the necessity of employing conventional adhesives. Moreover as the molten metal melts such portions and particularly the ring projection 35, because the melted portions of the side wall 12 are actually confined by the molten metal within the die cavity 45, the molten metal upon cooling serves to act itself as a mold for such molted portions of the wall 12 and thus forces the wall 12, upon cooling and solidifying, into its original shape to preserve the desired structure of the wall 12.

In simplest operation of the mold assembly 40, when the cavity 45 is generally filled with molten metal the injection of molten metal is stopped and the metal allowed to cool and the mold apparatus 40 thereafter opened for example by upward movement of the die block 41 by means of rod 50 and bar 50a operating through a hinge 56. Simultaneously, shaft 51 in die block 43 is rotated by driving means (not shown) to free the threaded section 53 from the nut 22 now solidly embedded in the terminal 11. The die block 43 is then withdrawn downwardly from engagement with the side wall 12 and the container 10 thereupon is recovered with terminal 11 cast in place through the side wall 12.

As previously indicated one of the unique features of the method of this invention is that the casting of the molten metal to form the unitary terminal 11 is effected without destroying the relatively thin, thermally deformable side wall 12 or deteriorating its structure such as the wall port 30 with the resultant loss of a fluid tight seal about the cast terminal 11 through the wall 12. This is achieved according to the present method essentially by controlling the temperature of the metal within the die cavity 45, by various means including principally the regulation of the quantity of heat energy introduced into the die cavity 45 by the molten metal injected via sprue 46 through gate 47 and, as previously indicated, by allowing the metal during cooling to act itself as a mold for any portions of the wall 12 which have been melted by the molten metal. Sufficient heat is however introduced into the cavity 45 so as to allow the molten metal to freely flow to form the desired shape of the terminal 11 as predetermined by the conforming configurations of the concave sections 42 and 44 of the die blocks 41 and 43, respectively, and yet still prevent the destruction of the relatively thin, side wall 12 or structure of the port 30 such as the boss structure 31. (FIG. 6)

In achieving these objectives in accordance with the method of this invention and with reference again to FIG. 7, the molten metal flows into and ultimately fills the die cavity 45. Then in a preferred embodiment the molten metal begins to flow out of the die cavity 45 into sprue 48 via gate 49. Sprue 48, in this preferred operation, terminates in a cavity reservoir 60 located in die block 41. This cavity reservoir 60 is designed so that it will only receive a fixed quantity of the molten metal entering via the sprue 48. When the die reservoir 60 is completely full of molten metal a back pressure is created which ultimately raises the pressure of the molten metal at point A in the metal delivery sprue 46. Suitable sensing means (not shown) detect this increase In pressure and through conventional control means (not shown) the metal injection cycle is terminated and the mold apparatus 40 quickly thereafter opens. This procedure accordingly permits only a predetermined mass of molten material to pass into the die cavity 45. Accordingly, by adjusting the volume capacity of the die reservoir 60 and controlling the temperature of the molten metal entering sprue 46 the amount of heat energy introduced into the die cavity 45 with the molten metal can be readily controlled. This allows a convenient and simple means of controlling the temperature and quantity of heat within the die cavity 45 so as to avoid destruction of the material of side wall 12 and particularly the structure of wall port 30 which are in contact with the molten metal within the die cavity 45. To assist in regulating the temperature other auxiliary control means may also be suitably employed and as illustrated in FIG. 7 passageways 61 are shown in die blocks 41 and 43 through which a heat exchange fluid (not shown) flows to assist in regulating the temperature of the die blocks 41 and 43 and hence the temperature of the die cavity 45.

In regulating the temperature or quantity of heat energy in the die cavity 45 utilizing the die reservoir 60 and in casting terminals in container 10 fabricated for example from plastics such as polypropylene where the thickness of the side wall 12, ranges from about 0.1 to about 0.2 inches, the quantity of molten metal injected into die cavity 45 via sprue 46 generally should range from about 3.0 to about 6.0 unit volumes of metal per unit volume of the die cavity 45 with a range of from about 4.5 to about 4.9 volumes of metal per unit volume of the die cavity 45 being preferred. The volume or capacity of the die reservoir 60 is of course, readily adjusted to accept only the particular volume desired within such ranges. The temperature of the metal injected as generally measured at the start of the injection cycle and at point A at the inlet of sprue 46 must of course be above its melting point and in the case of lead or lead containing alloys such temperature should be above about 620° F. The temperature of the metal generally should be maintained so that it does not exceed about 130° F. above or more usually about 80° F. above such melting point temperature so as to avoid introducing excessive sensible heat into the die cavity 45 with the molten metal to destroy or deteriorate the side wall 12. Accordingly when using, for example, lead or lead containing alloys the temperature of the metal should be maintained at the start of the cycle within the range of about 620° F. to 750° F. or more preferably about 690° F. to about 710° F.

As a further and important means of controlling the temperature or the heat energy within the die cavity 45, so as to avoid destroying the wall 12, the time of the molten metal and resulting hot solidified metal in contact with the wall 12 within the die cavity 45 can be regulated. This contact time includes the time required to inject the desired quantity of molten metal into the cavity 45 and the dwell time necessary to cool the temperature of the molten metal in the cavity 45 to below its solidification point and further to below the heat distortion temperature range of the material used to fabricate the wall 12. The time of injection will generally be a function of the injection pressure within sprue 46 and the diameter of the gate 47. Generally, however, when injecting a metal such as lead under an injection pressure of from about 850 to about 1050 pounds per square inch and within the quantity range of from about 3.0 to 6.0 unit volumes of metal per unit volume of the die cavity 45, the injection time typically will range from about 2.0 to about 4.0 seconds with a preferred range being from about 2.5 to about 3.5 seconds. Once the desired quantity of metal is injected the dwell or cooling time should be of sufficient duration to allow the temperature of the metal to cool to below the continuous heat distortion temperature of the material of wall 12. This will prevent wall 12 which has been heated by the metal and which is now held substantially rigid by the solidified metal from being distorted by any mechanical forces exerted, for example, during removal of the container 10 from the mold assembly 40. Typically this dwell time after the metal is completely injected and prior to opening the mold assembly 40, for such materials as polypropylene should range from about 2.0 to about 6.0 seconds and more preferably within about 3.0 to about 4.0 seconds.

As previously mentioned, the temperature regulation may be assisted by passage of a suitable cooling or heating fluid such as water through passageways 61 as regulated by suitable thermostat means (not shown). This temperature regulation may be further assisted by the particular metal and mass thereof chosen for construction of the die blocks 41 and 43. Also in certain instances particularly during start-up of mold apparatus 40 the temperature particularly at the faces of the concave sections 42 and 44 may be controlled by heating such as with induction rods (not shown) so as to prevent any freezing of the molten metal at the surfaces of such concave sections 42 and 44 which as discussed hereinafter could result in the entrapment of air in the molten metal.

Aside from providing temperature or heat energy control for the die cavity 45, die reservoir 60 also can be utilized to serve another important and preferred procedure in practicing the method of this invention. As previously mentioned, in producing terminal 11 in the side wall 12 of battery container 10 one of the conventional procedures involves placing a plurality of terminal portions into place within a side wall opening and welding such portions together to form a unitary terminal locked in place through the side wall. This welding however, typically provides an undesirable porous or metal oxide surface and in certain instances a high internal resistance as a result of the high welding temperatures involved. Such porous surface adversely affects the ability of the terminal to conduct electricity and, as previously mentioned, also frequently prevents the cell plate straps from being properly jointed to the terminal by welding in conventional battery construction which often results thereafter in battery failure. The present casting method does, of course, avoid such welding techniques in making a unitary, one piece terminal but moreover at the same time the casting method of this invention produces a terminal having highly desirable electrical properties or current carrying ability. This is accomplished in the method of this invention essentially by casting the terminal so as to preclude the entrapment of any air in the terminal metal which would create a porous or oxide surface and thus reduce the electrical or weldable properties of the cast terminal.

This avoidence of entrapped air within the cast terminal 11 is effected according to the method of this invention essentially by removing the air from the die cavity 45 during the casting operation. In operation and as best illustrated in FIG. 7, as the molten metal flows into the die cavity 45 via sprue 46 the air originally contained therein is displaced by such molten metal and flows out of the die cavity 45 via rate 49 and sprue 48. This displacement of air by the flowing molten metal will in most instances remove substantially all of the air originally contained within the die cavity 45 so as to avoid entraping air in a quantity sufficient to adversely affect the electrical or weldable properties of the cast terminal 11. However, as the molten metal flows through the die cavity 45 some air particularly at the interface of the air and the molten metal is not forced out of the die cavity 45 but instead becomes entrapped within the molten metal. To avoid even this small amount of entrapped air within the final cast terminal and in accordance with a preferred embodiment of the method of this invention, the initial portion of the molten metal introduced in the die cavity 45 is withdrawn from the die cavity 45 via gate 49 and sprue 43. Thus the initial portion of the molten metal which may contain entrapped air does not form any part of the final cast terminal 11 and consequently preserves the desirable electrical and weldable properties for the terminal 11. Thus in utilizing die reservoir 60 to control the heat energy introduced into the die cavity 45 such die reservoir 60 also additionally serves with the gate 49 and sprue 48 to facilitate the complete elimination of any entrapped air from the cast terminal with the result that the final solidified terminal 11 has a surface substantially free of entrapped air and thus desirable electrical and weldable properties.

As may be observed from the foregoing and with particular reference to FIG. 7 the terminal 11 of this invention may accordingly be readily formed in a highly efficient and economical manufacturing procedure. Moreover the terminal 11 can be readily and simply shaped to any desired configuration by appropriate selection of the desired corresponding shapes for the concave sections 42 and 44 of the die blocks 41 and 43 respectively. Economy of operation is further achieved in practicing the method of this invention because the mass of metal in die reservoir 60 as well as that remaining in sprues 46 and 48 after cooling of the injected metal within the die cavity 45 may be readily recovered for reuse by employment of suitable conventional knock out pins (not shown) in the die blocks 41 and 43.

I claim:

1. A method for forming a metal terminal extending within and through a wall of a battery container fabricated of a thermally deformable material, said terminal providing electrical conduction between the interior and exterior of such container, which method comprises:

providing a wall of such container with a port of preformed configuration adapted for receiving and holding a terminal;

injecting molten metal into such port and within a die mold cavity positioned about the port to shape the molten metal into a terminal of a unitary member having the desired shape, the port in conjunction with the die mold cavity initially acting as a mold for the molten metal;

controlling the temperature of the metal so that said metal freely flows to form the desired shape of the terminal and solidifies without destroying the structure or composition of such port and wall and, upon cooling, acts as a mold for any melted portions of the thermally deformable material to preserve the preformed configuration of said port; and, recovering the container with the solidifed material extending within and through the wall in the desired shape with desirable electrical properties and providing a fluid tight seal about the terminal between the interior and exterior of the container.

2. The method of claim 1 wherein during the injection of the molten metal into the port and within the mold cavity and prior to solidification of the metal, the air within the port and mold cavity is removed to prevent entrapment of air in the solidifying metal and thus maintain desirable electrical properties for the terminal.

3. The method of claim 2 wherein the air is removed by displacement during injection of the molten metal.

4. The method of claim 3 wherein the air is removed by entrapping portions of the air within the molten metal and removing the molten, air-containing molten metal from the port and mold cavity prior to solidification of the metal.

5. The method of calim 1 wherein prior to the injection of the molten metal, an internally threaded, metal insert is first positioned within the port so that when the molten metal is later injected such metal flows about the insert and upon solidifying locks the insert within the terminal to provide a threadable means for external mechanical connection to the terminal.

6. A terminal produced in accordance with the method of claim 1.

7. The terminal of claim 6 wherein the cast terminal has a main body portion extending through the wall and flared end portions extending laterally over and flush with the adjacent portions of the interior and exterior surfaces of the wall to anchor the cast terminal in place within and through the wall.

8. The terminal of claim 6 wherein the cast terminal is substantially free of entrapped air to provide desirable electrical properties.

9. The terminal of claim 6 wherein the terminal is positioned in a port integral with the wall and such port comprises a boss structure with a circular ring portion extending outwardly from the wall and defining an opening through the wall within and through which the terminal is cast directly from molten metal.

10. The terminal of claim 9 wherein the circular ring portion of the boss structure comprises a plurality of ring projections defining hollow concentric spaces therebetween which contains conforming projecting portions of the cast terminal to anchor the solid terminal in a locked position within and through the wall.

* * * * *